(12) United States Patent
Okada

(10) Patent No.: US 7,046,853 B2
(45) Date of Patent: May 16, 2006

(54) EFFICIENT DECODING METHOD AND APPARATUS FOR GRADUALLY CODED IMAGES

(75) Inventor: Shigeyuki Okada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 520 days.

(21) Appl. No.: 10/156,565

(22) Filed: May 24, 2002

(65) Prior Publication Data

US 2002/0181789 A1 Dec. 5, 2002

(30) Foreign Application Priority Data

May 31, 2001 (JP) ............................. 2001-165941

(51) Int. Cl.
*G06K 9/36* (2006.01)

(52) U.S. Cl. .................................... 382/233

(58) Field of Classification Search ................ 382/232, 382/233, 236, 240, 264, 298, 299, 305; 375/240.16, 375/240.19, 240.25, 340; 386/68; 709/247
See application file for complete search history.

(56) References Cited

U.S. PATENT DOCUMENTS

| | | | |
|---|---|---|---|
| 5,761,248 A * | 6/1998 | Hagenauer et al. ......... | 375/340 |
| 5,768,536 A * | 6/1998 | Strongin et al. ............ | 709/247 |
| 6,075,918 A * | 6/2000 | Strongin et al. .............. | 386/68 |
| 6,628,714 B1 * | 9/2003 | Fimoff et al. .......... | 375/240.16 |
| 6,801,667 B1 * | 10/2004 | Lindquist .................... | 382/240 |
| 2002/0003904 A1 * | 1/2002 | Shinagawa et al. ......... | 382/236 |
| 2003/0023758 A1 * | 1/2003 | Yoshikawa et al. ......... | 709/247 |

FOREIGN PATENT DOCUMENTS

| | | |
|---|---|---|
| JP | 06-268573 A | 9/1994 |
| JP | 09-261066 A | 10/1997 |
| JP | 10-145783 A | 5/1998 |
| JP | 10-215453 A | 8/1998 |
| JP | 2000-023157 | 1/2000 |
| JP | 2001-45488 A | 2/2001 |
| KR | 2001-40244 A | 5/2001 |
| WO | WO99/16249 A1 | 4/1999 |
| WO | WO 00/08592 | 2/2000 |

OTHER PUBLICATIONS

Chinese Office Action dated Jun. 11, 2004.
Notification of Reasons for Rejection in corresponding Korean Patent Application No. 10-2002-28720 mailed on Nov. 30, 2004 together with English translation.

* cited by examiner

*Primary Examiner*—Andrew W. Johns
*Assistant Examiner*—Amir Alavi
(74) *Attorney, Agent, or Firm*—McDermott Will & Emery LLP

(57) ABSTRACT

Coded image data which are coded hierarchically are decoded successively by an inverse wavelet transformer. During a process of decoding, images of intermediate hierarchy are stored in a frame buffer. In a case where constrains are placed on memory capacity or power capacity utilizable for a decoding processing, or resolution at an outputting end is limited, an abort processor discontinues or aborts the decoding processing in the middle. Then, the abort processor extracts intermediate-hierarchy images obtained by that time, from the frame buffer, and performs thereon an image processing such as a scaling, as appropriate, so as to be used as final decoded images. Thereby, a processing cost is markedly reduced.

8 Claims, 6 Drawing Sheets

W12

EFFICIENT DECODING METHOD AND APPARATUS FOR GRADUALLY CODED IMAGES

BACKGROUND OF THE INVENTION

1. Field of the Invention

The present invention relates to an image decoding technology, and it particularly relates to method and apparatus for decoding coded image data.

2. Description of the Related Art

In the twentieth century, which was often called "The Century of Images," a great variety of pictures and images were produced and put to use in movies, TV broadcasts and so forth. During the 1990's in particular, the widespread use of PCs (personal computers) and other information equipment, the popularization of digital cameras, color printers and so forth and the explosive increase in the use of the Internet accounted for deep infiltration of the culture of digital images into everyday life of ordinary people. Under these circumstances, coding and compression technologies, such as JPEG (Joint Photographic Expert Group) for still images and MPEG (Motion Picture Expert Group) for moving images, have been standardized so as to improve the facility of distribution and reproduction of the images through recording media, such as CD-ROM, and transmission media, such as networks and broadcasting waves. JPEG2000, which is an advanced version in the JPEG series, has already been announced, and the middle- to long-term targets for MPEG have already been worked out, too. Therefore, the on-going and future refinement of image processing technologies will without doubt lead us deeper into the world of digital images.

Standardization of image data formats promotes the exchanges of data between digital equipment. For example, the memory card about half the size of a name card enables data exchange between portable and other information equipment quite easily today. Data of images taken by a digital camera can be easily outputted by a high-definition color printer that supports the same data format. From now on, it is expected that there will be more and more scenes in which image data will be exchanged for use through various different types of equipment and devices.

SUMMARY OF THE INVENTION

The present inventor, in view of the foregoing situations, has come to recognize a problem described hereinbelow. That is, when, for instance, an image taken by a digital camera has an original resolution of 640×480, a scaling of the image is required if it is to be displayed on an LCD of 320×200. On the other hand, if a thumbnail image of 120×80 is to be produced, then a scaling need also be performed. Generally speaking, the scaling requires the processing time and memory access volume (namely, the bandwidth) that are nearly proportional to the size of the original image which is to be processed. Thus, in this example, there is caused a load proportional to the size of 640×480 of the original image if image data for LCD output therefor are to be generated or thumbnail image data therefor are to be produced.

The present invention has been made based on these considerations, and an object thereof is to provide an image decoding technology which can reduce the load required for image decoding processings, and reduce power consumption.

A preferred embodiment according to the present invention relates to an image decoding method. In this method, an intermediate image generated during a process which gradually decodes coded image data generated by coding an original image is utilized as a final decoded image.

Another preferred embodiment according to the present invention relates also to an image decoding method. This method includes: generating an intermediate image by decoding gradually coded image data which are generated by coding an original image; discontinuing the generating the intermediate image, in accordance with a processing capacity at any point of a decoding to an outputting thereof; and utilizing, as a final decoded image, an intermediate image obtained at the time of the discontinuing.

Still another preferred embodiment according to the present invention relates also to an image decoding method. This method includes: generating an intermediate image by gradually decoding coded image, which are data generated by coding an original image hierarchically, and by following a hierarchy level thereof; discontinuing the generating the intermediate image at a hierarchy level determined in accordance with a processing capacity at any point of a decoding to an outputting thereof; and utilizing, as a final decoded image, the intermediate image obtained at the time of the discontinuing.

In a case of normally decoding images, it is of course sufficient that only those images obtained after a decoding has been completed thereon are acquired. However, in this preferred embodiment, intermediate images resulting in a process of the decoding are rather intentionally acquired and utilized. For example, even though resolution of the intermediate image is lower than that of a finally decoded image or the intermediate image is dominated by low-frequency components, such the intermediate image is usable if it is capable of being displayed. Moreover, according to a certain usage, it is convenient to use those with lower resolution instead, so that this preferred embodiment is suitable for such a case. For example, when during a course of processings from an image decoding up to display and printing of decoded images there is a constraint for a processing capacity such as a memory capacity, power consumption, CPU and resolution, a decoding process is discontinued in the middle and intermediate images obtained by that time are utilized in place of final decoded images. Thereby, a processing cost is reduced.

In a case where the image decoding is carried out under a hierarchy structure or recursive structure, the intermediate image may be an image of an intermediate hierarchy level or intermediate recursive level generated in the decoding process thereof. In this case, the intermediate images of the intermediate hierarchy are many times generated naturally during a hierarchy or recursive processing, thus being convenient for implementation of this embodiment. Hereinafter, when an "intermediate image" is simply referred to, this term also encompasses an "image of the intermediate hierarchy." Moreover, the intermediate image may be an image whose resolution is lower than that of the original image, and the intermediate image may be an image in which a low-frequency component of the original image predominates.

Effective resolution of an outputting end which displays the decoded image may serve as the processing capacity, and in the discontinuing step the generating the intermediate image may be discontinued at a stage where an intermediate image suitable for the effective resolution is generated. Moreover, a usable memory capacity of the outputting end which displays the decoded image may serve as the processing capacity, and in the discontinuing step the generating the intermediate image may be discontinued at a stage where an intermediate image suitable for the memory capacity is generated.

Moreover, a memory capacity usable for a processing of the decoding may serve as the processing capacity, and in the discontinuing step the generating the intermediate image may be discontinued at a stage where an intermediate image suitable for the memory capacity is generated.

Moreover, power consumption allowed for one of a processing of the decoding and display of the decoded image may serve as the processing capacity, and in the discontinuing step the generating the intermediate image may be discontinued, according to the power consumption. Moreover, in a case when such a mode as a power saving mode is set, the decoding processing may be discontinued as appropriate.

The image decoding method may further include performing a processing of expansion and reduction on the final decoded image, to be suitable for effective resolution of an outputting end that displays the decoded image. This processing of expansion and reduction may be carried out when resolution of the intermediate image serving as the final decoded image is compared to that of the outputting end, and then the resolution thereof is found out unfit. Moreover, in place of this processing of expansion and reduction, or together with this processing of expansion and reduction, a trimming, edge emphasis or high-pass filtering, smoothing or noise reduction or low-pass filtering, color conversion, or other various image processings may be carried out.

Still another preferred embodiment according to the present invention relates to an image decoding apparatus. This apparatus includes: a decoding unit which decodes gradually coded image data generated by coding an original image and then generates an intermediate image; and an abort control unit which acts on the decoding unit and discontinues generation of the intermediate image, in accordance with a processing capacity at any point of a decoding to an outputting thereof, wherein the decoding unit outputs, as a final decoded image, the intermediate image obtained at the time of discontinuation by the abort control unit.

On the assumption that the original image is hierarchized and coded, the decoding unit may gradually perform a decoding processing by following a hierarchy level thereof, and may generate the intermediate image at an intermediate hierarchy. The decoding unit may carry out a two-dimensional inverse wavelet transform in a decoding process, and may generate an intermediate image by a subband that is constituted two-dimensionally by low-frequency components.

Still another preferred embodiment according to the present invention relates also to an image decoding apparatus. This apparatus includes: a shooting block; a mechanism control block which controls mechanism of the shooting block; and a processing block which processes digital images obtained by the shooting block. The processing block includes: a decoding unit which decodes coded image data of the digital images extracted from received signals; and an abort control unit which acts on the decoding unit and discontinues generation of an intermediate image, in accordance with a processing capacity at any point of a decoding to an outputting thereof. The decoding unit outputs, as a final decoded image, the intermediate image obtained at the time of discontinuation by the abort control unit.

Still another preferred embodiment according to the present invention relates also to an image decoding apparatus. This apparatus includes: a receiving block; a processing block which processes received signals; and a play-back block which reproduces signals that have been processed. The processing block includes: a decoding unit which decodes coded image data of digital images extracted from the received signals; and an abort control unit which acts on the decoding unit and discontinues generation of an intermediate image, in accordance with a processing capacity at any point of a decoding to an outputting thereof. The decoding unit outputs, as a final decoded image, the intermediate image obtained at the time of discontinuation by the abort control unit. The present image decoding apparatus further includes an interface block which outputs decoded images to an external device. The "external devices" may include a transmission channel or route such as network and passive elements such as a memory.

It is to be noted that any arbitrary replacement or substitution of the above-described structural components and the steps, expressions replaced or substituted in part or whole between a method and an apparatus as well as addition thereof, and expressions changed to a computer program, recording medium or the like are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

The preferred embodiments relates to an apparatus which decodes image data coded by JPEG2000.

Figure 1:
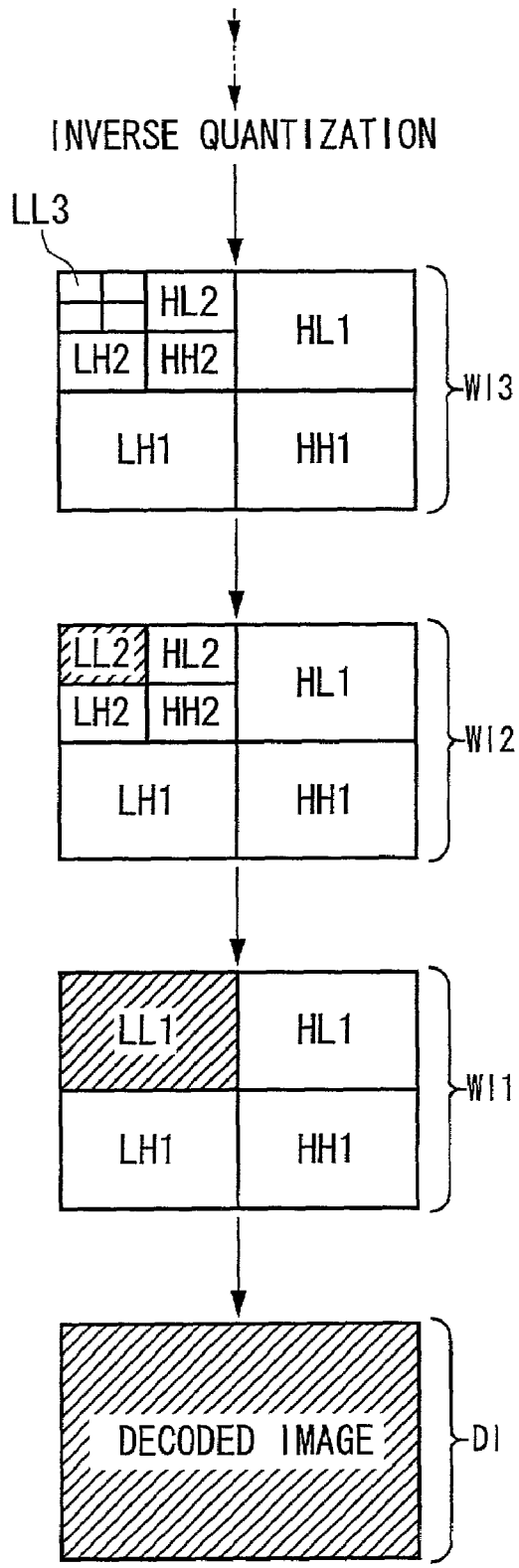
FIG. 1 shows a series of procedures in which coded image data are decoded by JEPG2000.

FIG. 1 illustrates a decoding process based on JPEG2000. As shown in FIG. 1, coded image data CI are first inputted and then subjected to an inverse quantization processing after such processings as arithmetic decoding and bit-plane decoding, as will be described later. At this stage, obtained is an image (hereinafter referred to as a "third-hierarchy image WI3") where a wavelet transform has been twice performed on an original image. Thereafter, an inverse wavelet transformation is performed on this image so as to generate a second-hierarchy image WI2. Then by a second-time inverse wavelet transform, a first-hierarchy image WI1 is obtained. Furthermore, a third-time inverse wavelet transform is performed on this image WI1 so as to obtain a decoded image DI.

To facilitate a better understanding, let us describe a coding procedure, which is, so to speak, inverse transformation of the processings shown in FIG. 1. Namely, a portion called the decoded image DI in FIG. 1 is the original image, and the first-hierarchy image WI1 is generated by subjecting the original image to one time of the wavelet transform. Filters for the wavelet transform used in JPEG2000 are Daubechies filters, the essence of which lies in the simultaneous operation of high-pass filter and low-pass filter in both vertical and horizontal directions of an image. Thus, the image resulting from the transformation is divided into a total of four bands, namely, an LL subband, which has low-frequency components in both x and y directions, an HL subband and an LH subband, which have a low-frequency component in one of the x and y directions and a high-frequency component in the other, and an HH subband, which has high-frequency components in both x and y directions. Moreover, this filter has an ability and operation to reduce the number of pixels to ½ in both x and y directions. Thus, as shown in FIG. 1, four subbands schematically shown in the first-hierarchy image WI1 (represented here by LL1, HL1, LH1 and HH1) are generated.

In the wavelet transform in coding, a predetermined number of filtering is carried out. In FIG. 1, the wavelet transform is performed three times, generating the second-hierarchy image WI2 and the third-hierarchy image WI3. The second and subsequent wavelet transforms are performed only on the LL subband component of the preceding-hierarchy image. For example, the LL1 subband of the first-hierarchy image WI1 is divided into four subbands which are LL2, HL2, LH2 and HH2, in the second-hierarchy image WI2. In a processing of coding, quantization and other processings are performed on the third-hierarchy image WI3 so as to obtain the coded image data CI finally.

To be noted concerning hierarchized images is that low-frequency components in the original image appears closer to the upper left corner in FIG. 1. In the case of the second-hierarchy image WI2 in FIG. 1, for instance, the LL2 subband in the upper left corner is of the lowest frequency. In other words, once this LL2 subband is obtained, it is possible to reproduce most basic characteristics of the original image. This knowledge and understanding will be utilized in embodiments described hereinbelow.

Figure 2:
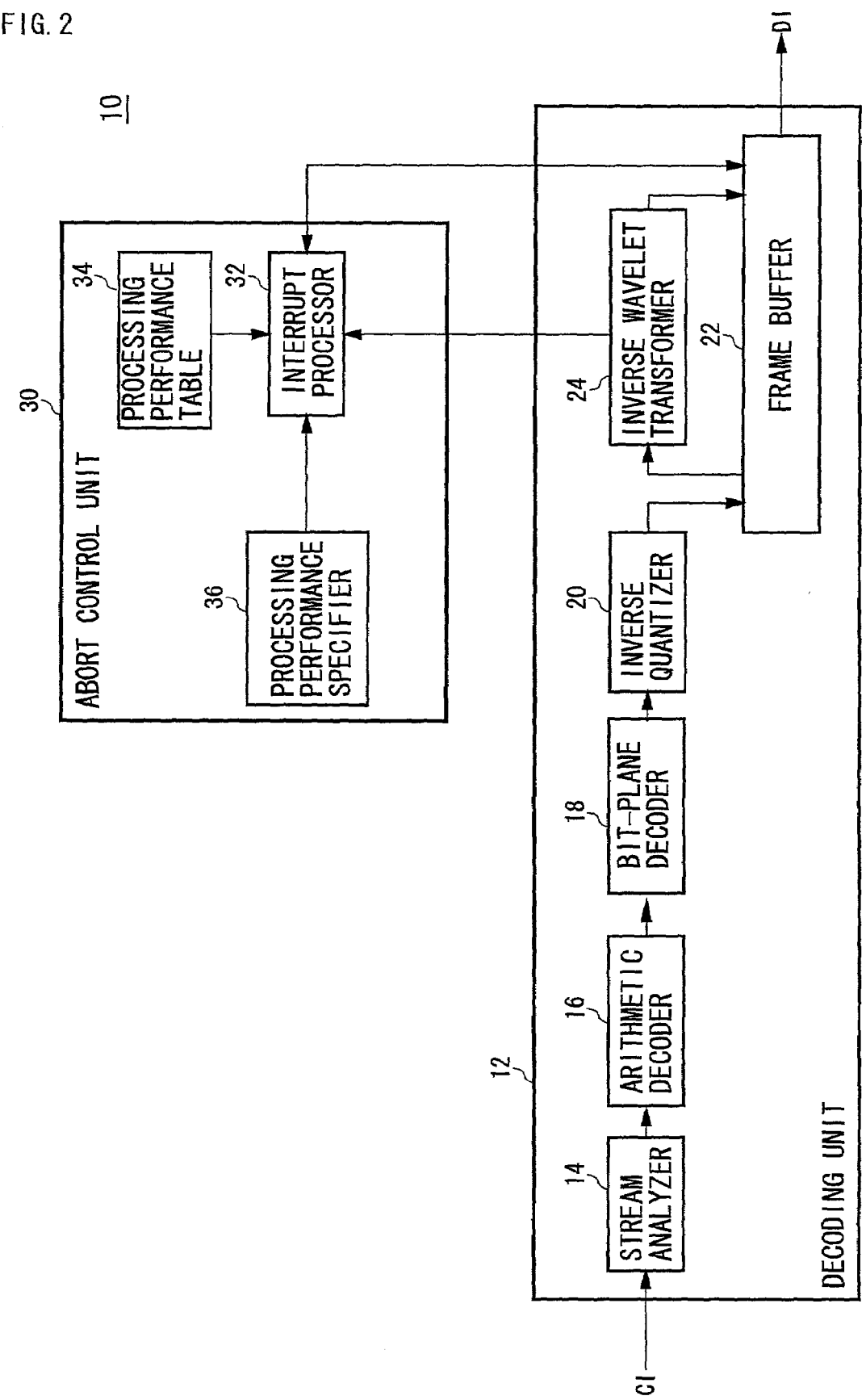
FIG. 2 shows a structure of an image decoding apparatus according to a preferred embodiment of the present invention.

FIG. 2 shows a structure of an image decoding apparatus 10. This structure can be realized by hardware, such as a CPU, a memory and other LSIs of arbitrary computers, or by software, such as a program or the like loaded in the memory. In FIG. 2, however, functions only, which are realized by combination of such hardware and software, are shown in blocks. Thus, it should be understood by those skilled in the art that these functional blocks can be realized by various modes such as hardware only, software only or combination thereof.

The image decoding apparatus 10 is comprised principally of a decoding unit 12 and an abort control unit 30. The decoding unit 12 includes a stream analyzer 14 which receives coded image data CI and analyzes the data stream thereof, an arithmetic decoder 16 which decodes arithmetically data sequences to be decoded as determined as a result of the analysis, a bit-plane decoder 18 which decodes the data thus obtained in a form of a bit-plane for each color component, an inverse quantizer 20 which inverse-quantizes the result, and an inverse wavelet transformer 24 which carries out an inverse wavelet transform on an n-th hierarchy image WIn obtained as a result of the inverse quantization. The inverse wavelet transformer 24 utilizes a frame buffer 22 as a work area. The decoded image DI obtained finally on completion of the decoding is outputted from the frame buffer 22 to arbitrary destinations. As examples of an outputting end, there are a display such as an LCD, a storage device such as a memory card or hard disk, a printing device such as a printer, or a server via a network.

On the other hand, the abort control unit 30 includes: an interrupt processor 32 which forcibly interrupts the decoding by the inverse wavelet transformer 24 and performs a predetermined processing on an n-th hierarchy image having thus far been generated; a processing performance table 34 which stores information on processing performance or capacity at any of stages between a decoding and an outputting of an image; and a processing performance specifier 36 which specifies a specific processing performance or capacity. The interrupt processor 32 determines resolution or image quality suited to a specified processing performance by referring to both a processing performance specified by the processing performance specifier 36 and information on the processing performance stored in the processing performance table 34. The interrupt processor 32 then determines a hierarchical level for the decoding by an inverse wavelet transform according to a determined resolution or image quality. Then, while monitoring a progress of decoding at the inverse wavelet transformer 24, the interrupt processor 32 forcibly interrupts the decoding process when the decoding has progressed to the determined hierarchical level, and discontinues the decoding process for the subsequent hierarchies.

The interrupt processor 32 reads from the frame buffer 22 an image of the low-frequency component LL subband (hereinafter referred also as an intermediate image) of the n-th hierarchy image WIn obtained at an interruption of the decoding process, and writes it back to the frame buffer 22 after performing a processing (described later) thereon if necessary. From the frame buffer 22, the intermediate image which has been processed by the interrupt processor 32 is outputted as the final decoded image DI.

In JPEG2000, the decoding of an image of the same hierarchy is carried out in the order of the LL subband, HL or LF subband, and HH subband. Since an image of the LL subband of a certain hierarchy is used as the intermediate image, which will then become the final decoded image DI, images of the HL, LH and HH subbands of this particular hierarchy are not used at all. Hence, when the decoding processing of the inverse wavelet transformer 24 is interrupted by the interrupt processor 32 at a certain hierarchical level, the decoding processing, in principle, is forcibly interrupted at a point when the decoding of the LL subband of that hierarchy is completed, and thus there will be no decoding processing for the other subsequent subbands of the same hierarchy.

Criteria for a decision to interrupt a decoding by the interrupt processor 32 at a certain hierarchical level are explained hereinbelow. The outputting end of an image may be a large LCD or a printer which requires high resolution or a viewfinder of a video camera for which low resolution suffices because of a small image size. This means that required image quality or resolution can vary from application to application. Therefore, resolution of a decoded image may be changed in consideration of display capacity of the outputting end.

Moreover, the decoding of images takes up a large memory capacity and places a considerable load on the CPU, and the volume of data on decoded images may impose a great burden not only on a memory of the outputting end but also on a transmission route to the outputting end. Thus, it is also necessary to take into account the processing performance and capacity of an apparatus that carries out the decoding, and the capacity of the outputting end. There are also cases where a decoding processing apparatus and/or a display apparatus at the outputting end are/is battery-driven, and in such cases it may be necessary to suppress or minimize power consumption by switching a state of battery charge into a power saving mode and shortening the processing time.

Directing attentions to these points, the interrupt processor 32 determines a stage at which to interrupt the decoding process according to various processing performances involved in the process from decoding to outputting of an image, which include CPU performance and memory capacity for the decoding processing, memory capacity for such outputs as display, printing and recording, performance of transmission to the outputting end, and allowable power consumption for the decoding apparatus or the display apparatus. Examples of the processing performance table 34 to be referred to in this determination of interruption are shown in FIGS. 3 and 4.

Figure 3:
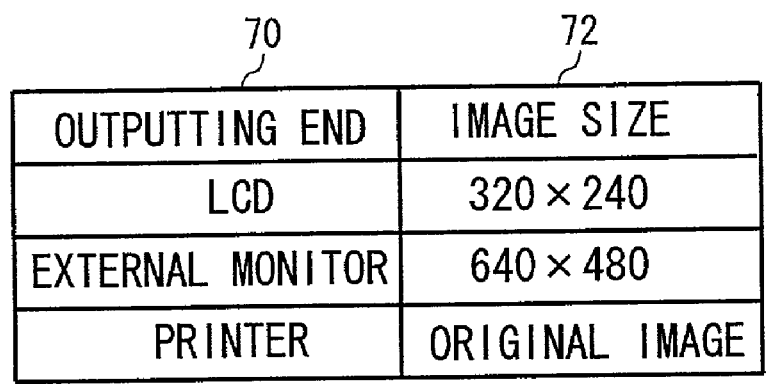
FIG. 3 shows an example of an internal structure of a processing performance table shown in FIG. 2.

FIG. 3 shows a processing performance table 34 which stores resolutions corresponding to different outputting ends. Names 70 of outputting ends and image sizes 72 that can be outputted at the outputting ends are stored in a manner that both 70 and 72 are associated with each other. The interrupt processor 32 receives information specifying the outputting end of a decoded image from the processing performance specifier 36, obtains the image size corresponding thereto by referring to the processing performance table 34, and thereby determines a hierarchy at which to obtain an intermediate image for use. For example, suppose that the size of coded image data is 1280×960. To display this image on an LCD of 320×240, the intermediate image of the second-hierarchy image WI2 is utilized as a restored image since the size of this intermediate image LL2 is 320×240. To display the image on an external monitor of 640×480, the intermediate image LL1 of the first-hierarchy image WI1 is utilized as a restored image since the size of this intermediate image LL1 is 640×480. In a case of outputting it from a printer, utilized is the original image, namely, the restored image DI, which is obtained after performing a restoring processing till the end.

Figure 4:
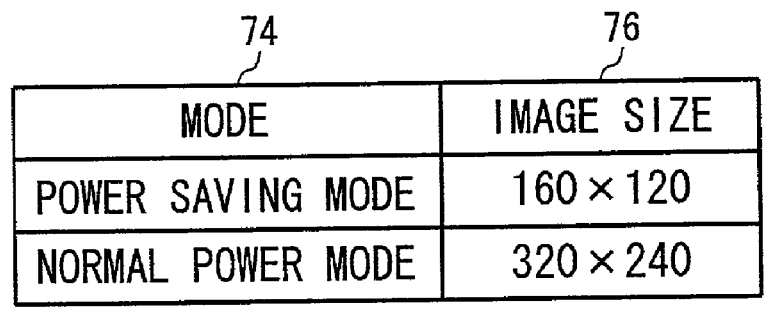
FIG. 4 shows an example of an internal structure of the processing performance table shown in FIG. 2.

FIG. 4 shows a processing performance table 34 which stores resolutions corresponding to different power consumption modes. Information stored in the processing performance table 34 is power consumption modes 74 and image sizes 76, which are associated with each other. For instance, in displaying an image from a digital camera on an LCD of 320×240, the interrupt processor 32 selects the maximum image size of 320×240 by referring to this processing performance table 34 if the interrupt processor 32 receives a specification of a normal power mode from the processing performance specifier 36. However, the interrupt processor 32 selects half the size, or 160×120, if the interrupt processor 32 receives a specification of a power saving mode from the processing performance specifier 36. In the power saving mode, the intermediate image LL3 of the third-hierarchy image WI3 can be used. This power consumption mode may be set automatically from a battery charge level, or may be set by a user by operating a mode setting function. Moreover, the power consumption mode may be so structured that mode switching is made between power supply by an AC adapter and battery drive. Moreover, it may be so structured that the processing performance specifier 36 monitors the battery charge level and instructs the interrupt processor 32 of a usable power level and thereupon the interrupt processor 32 measures or estimates the power consumption required by decoding and aborts or discontinues the decoding processing within an allowable range of power consumption.

As another criterion for the aborting or discontinuation by the interrupt processor 32, the resolution of an intermediate image to be extracted may be determined by the CPU performance of the image decoding apparatus 10 or by the memory capacity of the frame buffer 22. Moreover, the resolution of the intermediate image to be extracted may be determined by the memory capacity of a display device or a printing device at the outputting end. Or, a limiting condition may be set for the memory capacity usable at the outputting end, so that a maximum resolution may be selected within the limiting condition. Moreover, dynamic changes in a memory activity ratio may be monitored and grasped during a process of decoding, so that the decoding may be interrupted when the remaining memory capacity runs short.

As still another example, the resolution of the intermediate image may be determined not simply by the processing performance alone but by usage of an image. For instance, in the above example of displaying on an LCD of 320×240 size, the intermediate image LL3 of 160×120 at the third hierarchy, instead of the intermediate image of 320×240 at the second hierarchy, may be used if a thumbnail image of 120×80 size serves the purpose. In this case, there is disagreement in size between the intermediate image LL3 and the thumbnail image, so that the intermediate image is used as a restored image after being subjected to a processing to reduce the size to 120×80. For other usages, such as "still pictures" or "moving pictures" of a "digital camera", the processing performance specifier 36 may instruct the interrupt processor 32 of the usage of the image by the user, and the resolution determined for each usage may be obtained from the processing performance table 34. Such a resolution is determined by specifications for the digital camera belonging to the user or general specifications common to digital cameras.

By this operation of the interrupt processor 32, therefore, an intermediate image at an intermediate hierarchy obtained during a decoding process and suitable for a processing performance or usage can be utilized as a decoded image without carrying out the decoding processing till the very end to obtain the decoded image DI. Thus, processing time is shortened and memory occupancy is held low, and power consumption is significantly reduced as a result thereof.

Since the intermediate image of the LL subband obtained at the n-th hierarchy is of a size $\frac{1}{2}^n$ times the vertical and horizontal sizes of the original image, the intermediate image in its own size might be in disagreement with the image size of the outputting end. In such a case, the intermediate image is expanded or reduced as appropriate to be adjusted to the image size of the outputting end, and the thus adjusted intermediate image is utilized as a decoded image. This enlargement or reduction process involves such processings as interpolation of images and conversion of pixel values. These processings are normally performed by the interrupt processor 32 by extracting the intermediate image from the frame buffer 22. However, these processing may also be performed at the outputting end. Therefore, the processing may be so arranged and structured that the intermediate image of the LL subband is outputted directly to the outputting end from the frame buffer 22.

Moreover, suppose that this image decoding apparatus 10 is implemented to a digital camera or the like, then the photographic image may sometimes be enlarged or reduced by a zoom function. In such a case, the intermediate image of the LL subband can be expanded or reduced through interpolation and conversion processings, but image of the HL or LH or HH subband, if any, can be used to obtain an image twice as large in vertical and horizontal sizes by an inverse wavelet transform. In the above-described interrupt processing, therefore, instead of interrupting at the decoding of the image of the LL subband, the images of the subbands other than LL may also be decoded and stored in the frame buffer 22, so that at the time of zooming images of the subbands other than LL may also be inverse-transformed to an image of the next hierarchy so as to be used as restored images. Moreover, in a case where the images of the subbands other than LL are not available, an image of the next hierarchy may be restored by simplifying the pixel values to 0.

As still another method of abort or discontinuation control, an abort or discontinuation may be made by decoding only high-order bit-planes among the bit-planes whereas low-order bit-planes are not used, if the image quality required by the outputting end is low.

Figure 5A:
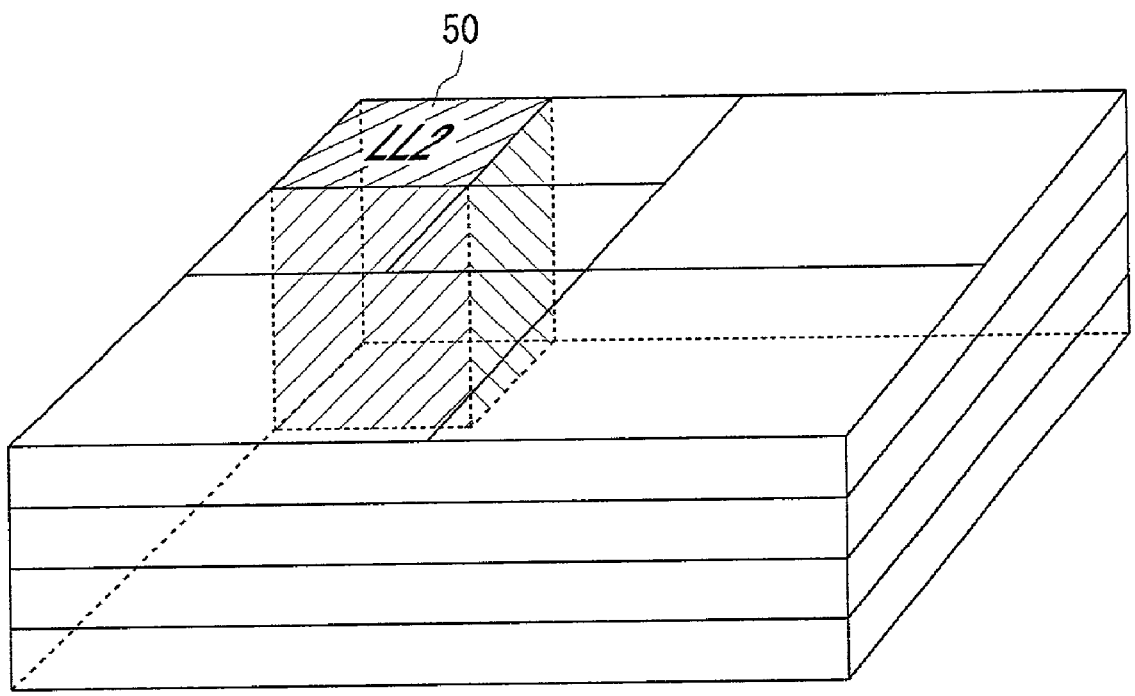
FIG. 5A and FIG. 5B show relationship between LL subbands of certain hierarchies and bit-planes thereof.

FIG. 5A shows a relationship between LL2 subband and bit-planes of the second-hierarchy WI2. In the second-hierarchy image WI2 in FIG. 5A, the LL2 subband is first decoded in such a way as to cut all the bit-planes vertically as illustrated by a rectangular parallelepiped 50. Thus, part of the decoding process can be eliminated by skipping bit-planes closer to the LSB (least significant bit) while minimizing the drop in image quality.

Figure 5B:
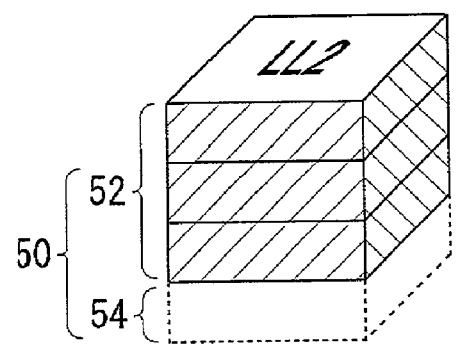

In FIG. 5B, the rectangular parallelepiped 50 for the LL2 subband is divided into a part 52 formed by effective bit-planes and a part 54 to be skipped. In this case, one least significant bit-plane is discarded in response to the image quality required by the outputting end.

As have been described, the decoding process is discontinued in the middle in response to a required resolution or image quality, by the abort control unit 30 in particular by a processing of the interrupt processor 32, and intermediate images obtained by that time can be used as restored images. However, since prevention of the drop in image quality has been well taken care of, relatively natural images are obtained. According to this embodiment, therefore, images can be restored in a short time in response to the resolution required by a display apparatus in a case of a relatively small-scale structure such as the digital camera or the like having two or more display units with different resolutions, such as a small built-in LCD and an external display, so that significantly great practical advantages are achieved. Moreover, since unnecessary restoring processing can be omitted, power consumption can be saved to a very significant level.

Merits of using the LL subband image as an intermediate image are summarized as follows:

1. Generally speaking, an image processing is subject to a processing load proportional to the image size. Hence, the processing load can be reduced to approximately $\frac{1}{2}^{2n}$ if used is an intermediate image of the n-th hierarchy whose vertical and horizontal image size is $\frac{1}{2}^n$ in both vertical and horizontal length. As a result thereof, improvements can be expected in terms of the processing time, the occupancy of the frame buffer 22 and the power consumption.

2. In certain cases, a scaling processing can be skipped. For example, where the image size required by an outputting end is $\frac{1}{2}^n$ of the original image size, an intermediate image of the n-th hierarchy can be used without changing its size. In other words, the scaling is practically completed at selection of an LL subband image at the n-th hierarchy. In this sense, too, an improvement is made in the efficiency of processing.

3. Using the LL subband image as an intermediate image also provides advantages in terms of image quality. In its design, image coding by wavelet transformation in JPEG2000 places emphasis on the image quality at low bit rates, so that the LL subband of the first-hierarchy image often realizes image quality equal to or even far superior to those of general filters used in scaling the original image that is the restored image DI. Thus, the extraction of the LL subband of an intermediate-hierarchy image, which also serves as a scaling processing, presents merits of JPEG2000 in image quality.

4. As a background where an intermediate image becomes reusable, it can be pointed out that its data format is the same as that of the original image. Namely, the coding of images by wavelet transformation is a pixel-by-pixel filtering and therefore remains within a range where display can be made by the same display system as the original image although pixel values and image size thereof may change. Thus, as with the restored image DI, the intermediate image withstands applications where the display is made as it is.

Figure 6:
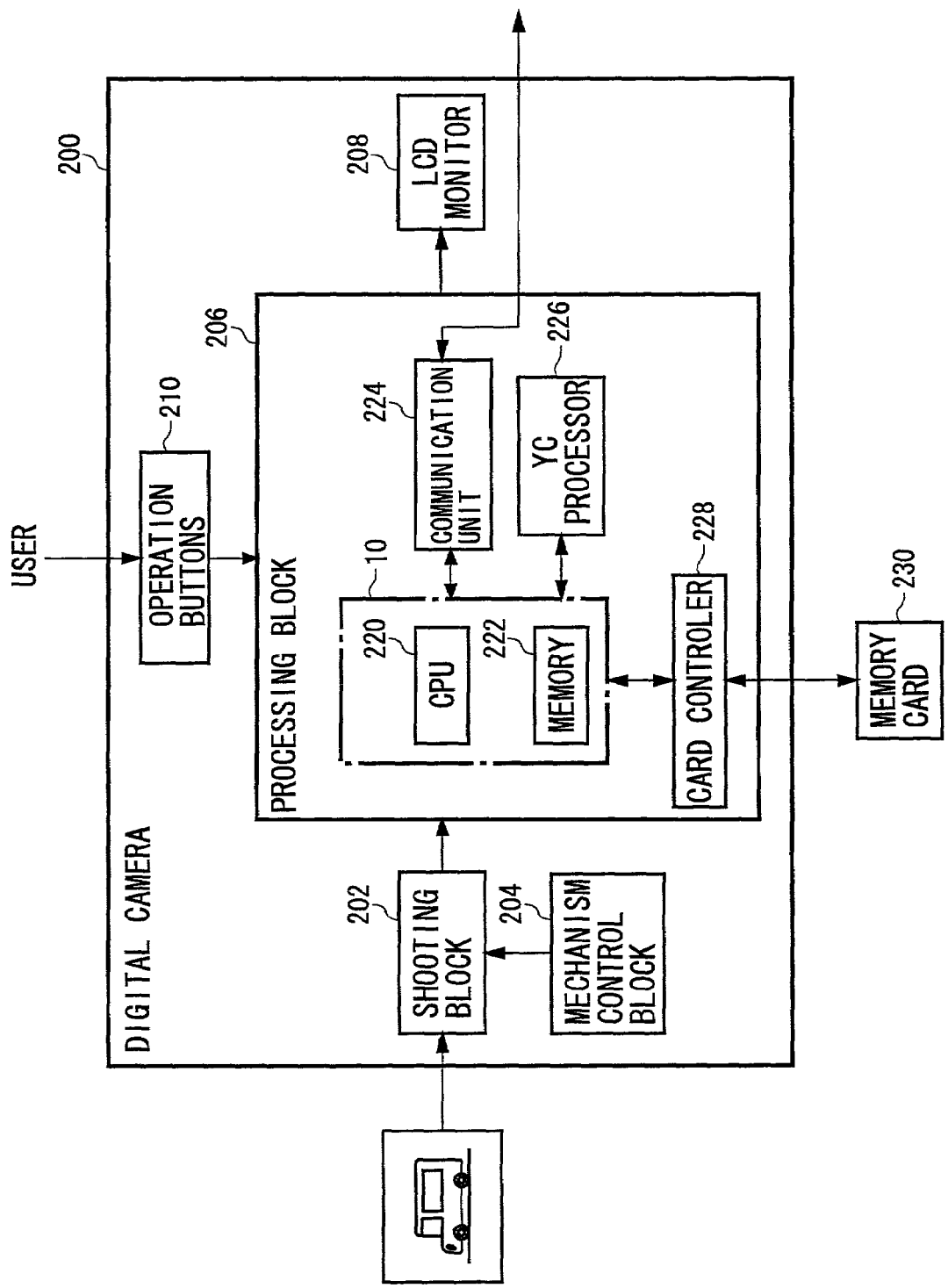
FIG. 6 shows a structure of a digital camera according to another preferred embodiment of the present invention.

FIG. 6 shows a structure of a digital camera 200 according to another embodiment of the present invention. The digital camera 200 includes a shooting block 202, a mechanism control block 204, a processing block 206, an LCD monitor 208 and operation buttons 210.

The shooting block 202 includes, though not illustrated here, lenses, diaphragms, optical low-pass filters, CCDs, signal processors, and so forth. Electric charges are accumulated in the CCDs according to amounts of light from a subject image formed on a light-receiving surface of the CCDs and read out as voltage signals. The voltage signals are divided by the signal processors into R, G and B components, which are then subjected to white balance adjustment and gamma control. Thereafter, the R, G and B signals are A–D converted to digital image data, which are outputted to the processing block 206. The mechanism control block 204 controls an optical system of the shooting block 202, namely, controls drives for zooming, focusing, aperture and other functions.

The processing block 206 includes a CPU 220 and a memory 222, which are both used to control the digital camera 200 as a whole, a YC processor 226, a card controller 228, and a communication unit 224. Of these components, part of functions of the CPU 220 and an image decoding program loaded in the memory 222 correspond to the image decoding apparatus 10 shown in FIG. 2. The frame buffer 22 of FIG. 2 can also be realized by using part of the memory 222. It is to be appreciated that with this digital camera 200, an image coding apparatus (not shown) too is realized by the CPU 220 and memory 222, so that image data may be stored in a memory card 230. Thus, in what follows, a structure will be described on the condition that it is capable of both coding and decoding.

The YC processor 226 generates intensity Y and color differences Cb and Cr from digital image data. The intensity and the color differences are independently coded in sequence. Coded image data CI are outputted to an external unit via the communication unit 224 or written into the memory card 230 via the card controller 228.

The communication unit 224 performs controls such as protocol conversion in accordance with standard specifications for communication and, besides these controls, exchange data with external devices such as printers or game machines, using individual interfaces.

The LCD monitor 208 displays not only shooting/reproduction mode, zoom ratio and date/time but also moving pictures, high-speed continuous images, still pictures shot and so forth. Thus, when moving pictures are taken by the user, they are first coded and compressed and then recorded on the memory card 230, for instance. When the user reproduces the moving pictures, the interruption processing against the decoding, which is characteristic of the present embodiment, is performed as appropriate. The operation buttons 210 include a power switch, a release switch and others that the user operates to do shooting or set various function modes.

The above-described structures provide the following advantages:

1. Since the decoding processing is interrupted, as appropriate, in response to the resolution or image quality required by the outputting end and then the intermediate image is utilized, the processing time for scaling can be shortened and the bandwidth reduced significantly. Therefore, it becomes easy to simultaneously perform, for instance, high-resolution still-picture recording and moving-picture shooting in the digital camera. Moreover, in a case of simultaneous recording of still images and thumbnail images, high-speed continuous shooting, for example, becomes easy too.

2. When moving pictures are shot and reproduced, the frame rate is predetermined, so that an interruption processing is performed depending on the decoding processing capacity and the intermediate image is utilized as a restored image. Thereby, the predetermined frame rate can be maintained while minimizing the drop in image quality. Moreover, without drastically raising operation speed of the image decoding apparatus 10, the moving pictures can be reproduced according to the processing capacity, thus providing merits in cost and power consumption.

As described above, by the skillful utilization of the processings and structures of JPEG2000 and directing special attentions to filters of high image quality of JPEG2000, improvements of efficiency of image processing are achieved with a relatively simple structure. Moreover, since the wavelet transformation is used for compression of frames in MPEG4, a scheme and mechanism similar to a case with still pictures can be applied to reproduction of moving pictures. Thus, an improvement on commercial values of digital camera, digital video and other image processing apparatus and an improvement on ease of operation thereof are realized.

Figure 7:
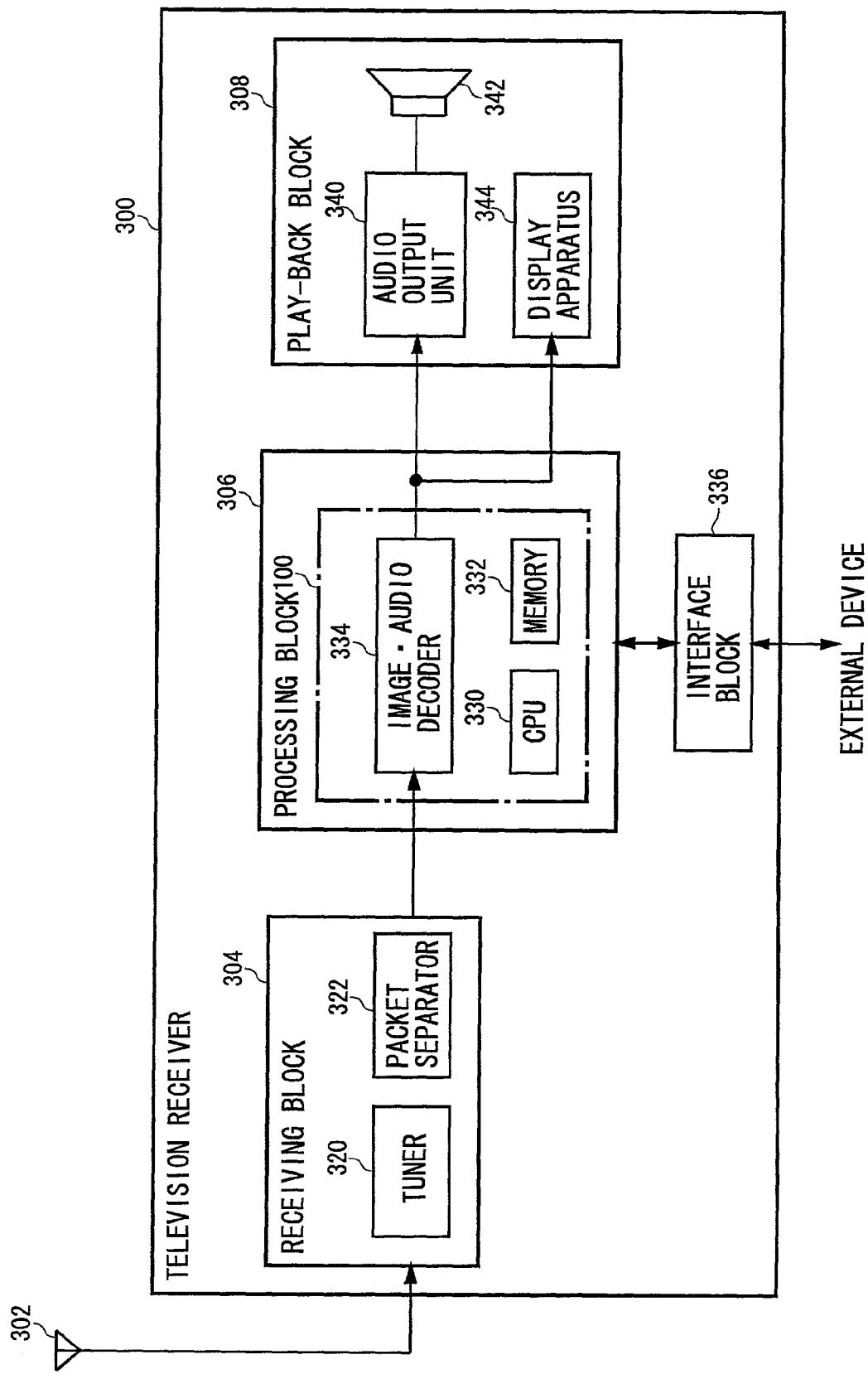
FIG. 7 shows a structure of a television receiver according to still another preferred embodiment of the present invention.

FIG. 7 shows a structure of a television receiver 300 according to still another embodiment of the present invention. The television receiver 300 includes an antenna 302, a receiving block 304 which receives broadcast waves via the antenna 302, a processing block 306 which processes image and audio data obtained as a result of a processing by the receiving block 304, and a play-back block 308 which reproduces audio and images decoded by the processing block 306. An interface block 336 outputs, as appropriate, the decoded image data from the processing block 306 to an external device.

The receiving block 304 includes a tuner 320 and a packet separator 322. The tuner 320 selects a transponder that carries a channel chosen by the user and performs a QPSK demodulation. A stream containing a plurality of transport packets obtained through the demodulation is sent to the packet separator 322. The packet separator 322, which is a demultiplexer, separates packets corresponding to a desired channel and outputs them to the processing block 306.

An image-audio decoder 334 in the processing block 306, in cooperation with a CPU 330 and a memory 332, decodes image and audio data which have been coded in and transmitted from a broadcasting station. The image-audio decoder 334 decodes inputted packets and outputs audio data to an audio output unit 340 and image data to a display apparatus 344. The audio output unit 340 applies a predetermined processing to the inputted audio data, and audio is finally outputted to a speaker 342. Of structural components of the processing block 306, namely, among the image-audio decoder 334, the CPU 330 and the memory 332, the part related to the image decoding corresponds to the image decoding apparatus 10 shown in FIG. 2. By implementing the above-described structure, so-called digital television can be realized at extremely low cost and power consumption. For example, small devices such as portable telephones can be equipped with this television.

The present invention has been described based on embodiments which are only exemplary. It is understood by those skilled in the art that there exist other various modifications to the combination of each component and each processing described and that such modifications are encompassed by the scope of the present invention. Such the modifications will be described hereinbelow.

In the above-described embodiments, the decoding of an image was cited as an example to explain the acquisition of a final restored image using an intermediate image. However, it is not necessary to limit the present invention to the decoding of images only, but it can be applied if the ongoing process of any image processing can be used as an intermediate image. For example, in a case where an original image is hierarchized through predetermined filterings a plurality of times, images at intermediate hierarchies are obtained naturally, thus being suitable and convenient for the purposes of the present invention. Filters used may be usual averaging filters or any arbitrary filters.

Moreover, for a similar reason, the present invention may be conveniently applied to image processings with some progressive nature such as specified in progressive JPEG. For example, it is possible that of images displayed progressively, the images appearing at intermediate hierarchies be used as intermediate images.

Although the digital camera was cited and described as an example in the above-described embodiment, it may of course be some other electronic devices. For example, the present invention can be applied to such equipment as facsimiles, copying machines and scanners which have therein an image pickup block and a processing block similar to those of the digital camera.

Although the television receiver was described as an example in the above-described embodiments in a similar manner, it may be any other equipment that have a receiving block and a processing block, for example, portable telephones or various PDAs (personal digital assistant) that can be connected to the Internet.

In FIG. 5B, a decoding process is discontinued by omitting a processing for the low-order bit-plane as to LL subbands. As another decoding method, processings for the four subbands may be carried out in units of bit-plane, in sequence starting from a most significant bit-plane. Namely, after a processing is performed in the order of LL, HL or LH, and HH subbands as to a certain bit-plane, the processing may be performed for a next low-order bit-plane in the same order as above. In this decoding method too, the decoding processing can be discontinued by omitting untreated low-order bit-plane processings. In this case, which differs from the case shown in FIGS. 5A and 5B, low-order bit-plane processings are omitted as to the whole four subbands.

According to the present embodiments, the efficiency of image decoding processing is significantly improved.

Although the present invention has been described by way of exemplary embodiments, it should be understood that many changes and substitutions may be made by those skilled in the art without departing from the scope of the present invention which is defined by the appended claims.

What is claimed is:

1. An image decoding method, comprising:
   generating an intermediate image by decoding gradually coded image data which are generated by coding an original image;
   discontinuing said generating the intermediate image, in accordance with a processing capacity at any point of a decoding to an outputting thereof;
   utilizing, as a final decoded image, an intermediate image obtained at the time of said discontinuing; and
   performing a processing of expansion and reduction on the final decoded image, to be suitable for effective resolution of an outputting end that displays the decoded image,
   wherein a memory capacity usable for a processing of the decoding serves as the processing capacity, and said discontinuing is such that said generating the intermediate image is discontinued at a stage where an intermediate image suitable for the memory capacity is generated.

2. An image decoding method according to claim 1, wherein resolution of the intermediate image is lower than that of the original image.

3. An image decoding method according to claim 1, wherein the intermediate image is an image in which a low-frequency component of the original image predominates.

4. An image decoding method according to claim 1, wherein effective resolution of an outputting end which displays the decoded image serves as the processing capacity, and said discontinuing is such that said generating the intermediate image is discontinued at a stage where an intermediate image suitable for the effective resolution is generated.

5. An image decoding method according to claim 1, wherein a usable memory capacity of an outputting end which displays the decoded image serves as the processing capacity, and said discontinuing is such that said generating the intermediate image is discontinued at a stage where an intermediate image suitable for the memory capacity is generated.

6. An image decoding method according to claim 1, wherein power consumption allowed for one of a processing of the decoding and display of the decoded image serves as the processing capacity, and said discontinuing determines a stage at which said generating the intermediate image is discontinued, according to the power consumption.

7. An image decoding apparatus, including: a shooting block; a mechanism control block which controls mechanism of said shooting block; and a processing block which processes digital images obtained by said shooting block,
   said processing block, including:
   a decoding unit which decodes coded image data of the digital images extracted from received signals; and
   an abort control unit which acts on said decoding unit and discontinues generation of an intermediate image, in accordance with a processing capacity at any point of a decoding to an outputting thereof,
   wherein said decoding unit outputs, as a final decoded image, the intermediate image obtained at the time of discontinuation by said abort control unit.

8. An image decoding apparatus, including: a receiving block; a processing block which processes received signals; and a play-back block which reproduces signals that have been processed,
   said processing block, including:
   a decoding unit which decodes coded image data of digital images extracted from the received signals; and
   an abort control unit which acts on said decoding unit and discontinues generation of an intermediate image, in accordance with a processing capacity at any point of a decoding to an outputting thereof,
   wherein said decoding unit outputs, as a final decoded image, the intermediate image obtained at the time of discontinuation by said abort control unit,
   the image decoding apparatus further including an interface block which outputs the decoded images to an external device.

* * * * *